United States Patent
You et al.

(10) Patent No.: US 10,377,189 B2
(45) Date of Patent: Aug. 13, 2019

(54) PRELIMINARY POSITIONING METHOD FOR A TIRE PRESSURE MONITORING SYSTEM

(71) Applicant: ORANGE ELECTRONIC CO., LTD, Taichung (TW)

(72) Inventors: Hong-Chih You, Taichung (TW); Jia-Cong Su, Taichung (TW); Xi-Wen Wu, Taichung (TW)

(73) Assignee: ORANGE ELECTRONIC CO., LTD, Taichung (TW)

( * ) Notice: Subject to any disclaimer, the term of this patent is extended or adjusted under 35 U.S.C. 154(b) by 212 days.

(21) Appl. No.: 15/396,826

(22) Filed: Jan. 3, 2017

(65) Prior Publication Data

US 2018/0186199 A1 Jul. 5, 2018

(51) Int. Cl.
B60C 23/04 (2006.01)

(52) U.S. Cl.
CPC ...... B60C 23/0416 (2013.01); B60C 23/0415 (2013.01); B60C 23/0437 (2013.01)

(58) Field of Classification Search
CPC ............ B60C 23/0416; B60C 23/0483; B60C 2/0476; B60C 23/047
USPC ............. 73/1.57, 146.2–146.8; 701/36, 29.1, 701/29.7, 30.5, 30.8, 31.1, 31.6; 702/98; 340/442, 445–448
See application file for complete search history.

(56) References Cited

U.S. PATENT DOCUMENTS

| | | | |
|---|---|---|---|
| 9,205,711 B2 * | 12/2015 | Kessler | B60C 23/0416 |
| 9,207,511 B2 | 12/2015 | Yamazaki et al. | |
| 2005/0134446 A1 | 6/2005 | Stewart et al. | |
| 2009/0096599 A1 * | 4/2009 | Kranz | B60C 23/009 340/459 |
| 2015/0239307 A1 * | 8/2015 | Horikoshi | B60C 23/0479 340/442 |

FOREIGN PATENT DOCUMENTS

TW   I490131 B   7/2015

\* cited by examiner

Primary Examiner — Robert R Raevis
(74) Attorney, Agent, or Firm — Bruce Stone LLP; Joseph Bruce

(57) ABSTRACT

A preliminary positioning method for a TPMS uses a receiver to receive a tire pressure signal, then obtains the ID code contained in the obtained tire pressure signal, then compares the ID code with the corresponding ID codes stored in the database, and defines the ID code as a known ID code, when the ID code is found to match with one of the corresponding ID codes prestored in the database. Repeating the above steps until the ID codes of all received tire pressure signals all have been compared. If the number of the known ID codes is equal to the number of the sensors, the known ID codes are designated as specific tires according to an indication of the respective tire pressure signals, so that the positioning function can be achieved in a short period of time.

12 Claims, 4 Drawing Sheets

PRELIMINARY POSITIONING METHOD FOR A TIRE PRESSURE MONITORING SYSTEM

BACKGROUND

Field of the Invention

The present invention relates to a wireless tire pressure measuring method, and more particularly to a preliminary positioning method for a tire pressure monitoring system.

Related Prior Art

In recent years, car accidents caused by abnormal tire pressure or tire blow out are not uncommon. Countries around the world actively introduced or pushed relevant laws. TPMS (tire pressure monitoring system) has become standard equipment of a vehicle in Europe and the United States. A TPMS essentially comprises four tire pressure sensors and a receiver. The tire pressure sensors are installed in the corresponding tires. Each of the tire pressure sensors will send a tire pressure signal to the receiver after every time interval, then the tire pressure values are displayed on a display, and a warning signal will be produced if the tire pressure value of any of the tires is abnormal.

In order to distinguish the tire pressure sensors installed in the left front, right front, left rear and right rear tires from one another, the known method is to provide each of the tire pressure sensors with an exclusive ID code (identification code). However, the tire pressure sensors must be installed according to the positions predetermined by the TPMS (for example, the tire pressure sensor with the reference number 100A must be installed in the left front tire, the tire pressure sensor with the reference number 100B must be installed in the right front tire), so that the TPMS can obtain the correct pressure values of the tires in the respective positions.

However, when a user wants to replace the tire pressure sensors, he/she has to read the ID codes of the respective tire pressure sensors, and then inputs the old ID codes one by one into the new tire pressure sensors to match with the ID codes of the tires in different positions pre-stored in the TPMS. The aforementioned complicated procedures must be implemented by the use of professional computer software. Therefore, an ordinary car owner is unable to replace the tire pressure sensors by him or herself. To this end, a TPMS which is capable of determining the positions of the respective tires without requiring the ID codes of the old tire pressure sensors has been invented.

However, it will take some time (approximately 20 minutes) for the TPMS to determine the positions of the tire pressure sensors, so a window period will appear in the tire pressure monitoring process, and then form security vulnerability. What is more, in many cases, the user only needs to drive the vehicle a small distance. Therefore, it is usual that the user has reached the destination before the TPMS determines the correct positions of the tire pressure sensors. In this way, the TPMS has lost its value, and therefore a preliminary positioning method for a TPMS becomes necessary.

The present invention has arisen to mitigate and/or obviate the afore-described disadvantages.

SUMMARY

One objective of the present invention is to provide a preliminary positioning method for a tire pressure monitoring system, which allows the TPMS to have a preliminary positioning function within a short period of time.

Another objective of the present invention is to provide a preliminary positioning method for a tire pressure monitoring system, which is capable of solving the problem of the incomplete tire pressure data caused when the receiver is unable to receive the tire pressure signal sent from the sensors.

To achieve the above objectives, the present invention provides a preliminary positioning method for a tire pressure monitoring system, wherein the tire pressure monitoring system is installed in a vehicle which has a plurality of tires, and comprises a receiver and a plurality of sensors, each of the sensors is installed in the tires to produce a tire pressure signal which contains a tire pressure data and an ID code, the tire pressure signal is sent to the receiver, the receiver includes a database in which is stored a plurality of corresponding ID codes; the preliminary positioning method comprising the following steps:

a first step including: receiving the tire pressure signal and obtaining the ID code contained in the received tire pressure signal;

a second step including: comparing the obtained ID code with the corresponding ID codes stored in the database, and defining the obtained ID code as a known ID code when the obtained ID code is found to match with one of the corresponding ID codes, and not defining the obtained ID code as a known code when the obtained ID code is found to match with none of the corresponding ID codes;

a third step including: repeating the first and second steps until all ID codes of all received tire pressure signals have been compared; and a fourth step including: counting the number of the known ID codes; either designating each of the known ID codes as a specific tire to finish the preliminary positioning method when the number of the known ID codes is equal to the number of the sensors; or implementing a procedure of adding tire pressure information when the number of the known ID codes is less than the number of the sensors;

wherein the procedure of adding tire pressure information includes the following steps:

a step A includes: obtaining a signal parameter of all the received tire pressure signals whose ID codes are not defined as the known ID codes;

a step B includes: defining the ID code of one of all the received tire pressure signals which have not been defined as the known codes as the known code, according to the signal parameter;

a step C includes: repeating the steps A and B until the number of the known ID codes is equal to the number of the sensors; and a step D includes: designating each of the known ID codes as the specific tire.

Preferably, in the fourth step and in the step D of the procedure of adding tire pressure information, the number of the sensors is four, and four tire pressure signals are sent to the receiver, based on signal strength of four tire pressure signals, the known ID code of each of two strong signal strength is designated as the tire which is close to the receiver, and the known ID code of each of two weak signal strength is designated as the tire which is located farther away from the receiver.

Preferably, in the fourth step and in the step D of the procedure of adding tire pressure information, the number of the sensors is four, and four tire pressure signals are sent to the receiver, based on temperature data of four tire pressure signals, the known ID code of each of two high temperature data is designated as the tire which is close to the receiver, and the known ID code of each of two low temperature data is designated as the tire which is located farther away from the receiver.

Preferably, in the step B, the signal parameter refers to a signal amount of the tire pressure signals received in a unit of time, the ID code of one of the received tire pressure signals which has the largest signal amount is defined as the known ID code.

Preferably, in the step B, the signal parameter refers to signal strength of the tire pressure signal, the ID code of one of the received tire pressure signals which has the strongest signal strength is defined as the known ID code.

Preferably, each of the second step and the step B further includes storing the known ID code in the database.

It can be learned from the above description that the preliminary positioning method for the TPMS of the present invention uses the receiver to receive a tire pressure signal, then obtains the ID code contained in the obtained tire pressure signal, then compares the ID code with the corresponding ID codes stored in the database, and defines the ID code as a known ID code, when the ID code is found to match with one of the corresponding ID codes prestored in the database. Repeating the above steps until the ID codes of all received tire pressure signals all have been compared. When the number of the known ID codes is equal to the number of the sensors, the known ID codes are designated as specific tires according to an indication of the respective tire pressure signals, so that the positioning function can be achieved in a short period of time.

When the receiver is unable to receive the tire pressure signal sent from the sensors, a procedure of adding tire pressure information is implement and includes: obtaining a signal parameter of all the ID codes of the tire pressure signals which are not defined as the known ID codes; defining the ID code of the tire pressure signals which have the largest signal parameter as a known ID code which is then stored in the database; repeating the above steps A and B until the number of the known ID codes is equal to the number of the sensors; designating the known ID codes as specific tires according to an indication (index) of the respective tire pressure signals. Therefore, the problem of the incomplete tire pressure data caused when the receiver is unable to receive the tire pressure signal sent from the sensors can be solved.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
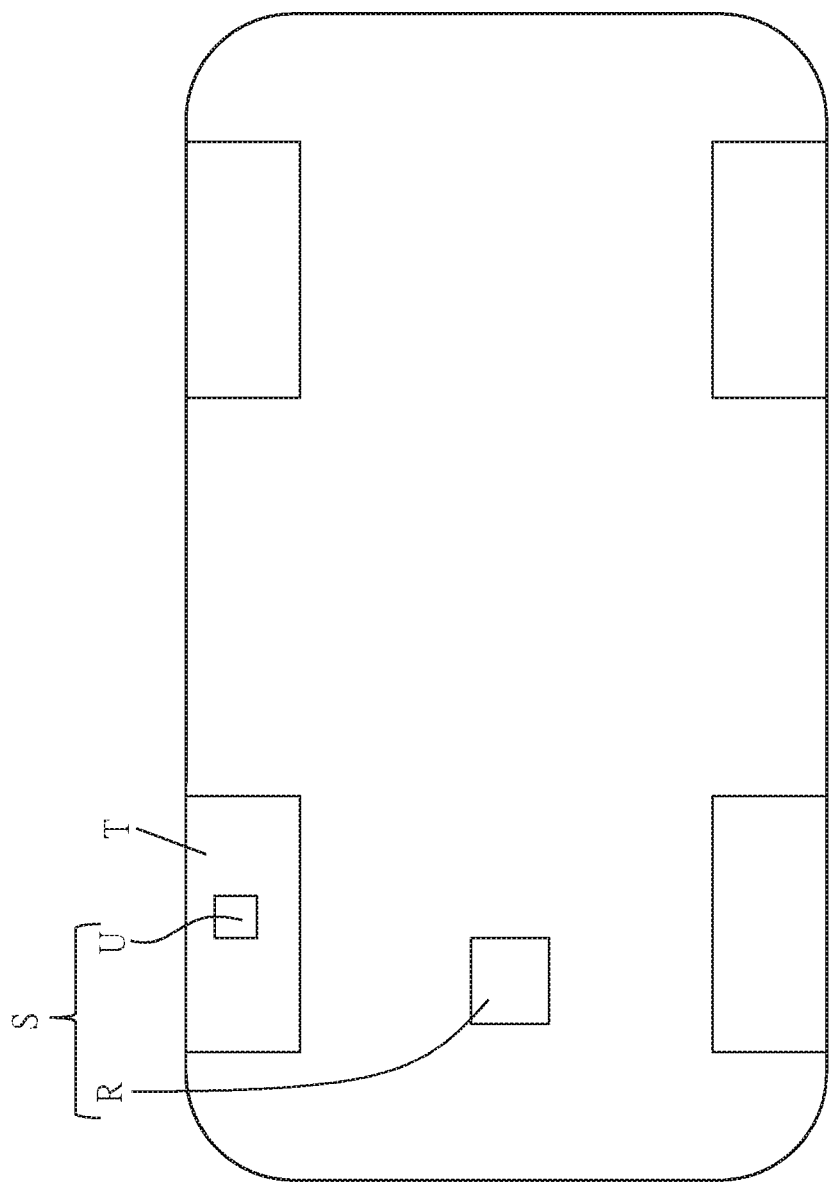
FIG. 1 is an illustrative view showing that the TPMS is installed on a vehicle.

The method of the present invention is applied in a TPMS. As shown in FIG. 1, the TPMS S comprises a receiver R and a plurality of sensors U. The sensors U are disposed in four tires T (including two front tires and two rear tires) of a vehicle, respectively, and each include a detecting device and a signal transmitting device. The detecting device can detect the data (such as pressure, temperature and etc) of the tires. Suppose that the information of the tires is tire pressure data. The tire pressure data is combined in an ID code which can be encoded into a tire pressure signal after a specific encoding process. The tire pressure signal is then transmitted to the receiver R by the signal transmitting device. The receiver R includes a signal receiving device and a database. It is to be noted that the tire pressure signals received by the receiver R are not limited to coming from the sensors of the same TPMS S, and can also include the signals coming from other sensors U (of a neighboring vehicle), or the signals with similar connotation to the tire pressure signals. Therefore, the quantity of the tire pressure signals received by the receiver R is larger than the quantity of the sensors U installed in the tires T. Four corresponding ID codes which correspond to the ID codes of the respective sensors are prestored in the database to determine the source of the signals. The signal receiving device receives the tire pressure signals, compares the ID codes of the tire pressure signals with the corresponding ID codes prestored in the database, and then displays the pressure data on a display screen of the vehicle for the driver to read the tire pressure data of the respective tires T. Since the TPMS S did not record which tires T the sensors U were installed in, it is impossible to know which tires T the respective ID codes indicate. Therefore, the driver only knows the values detected by the sensors, but has no idea which tires T the detected values belong to.

Figure 2:
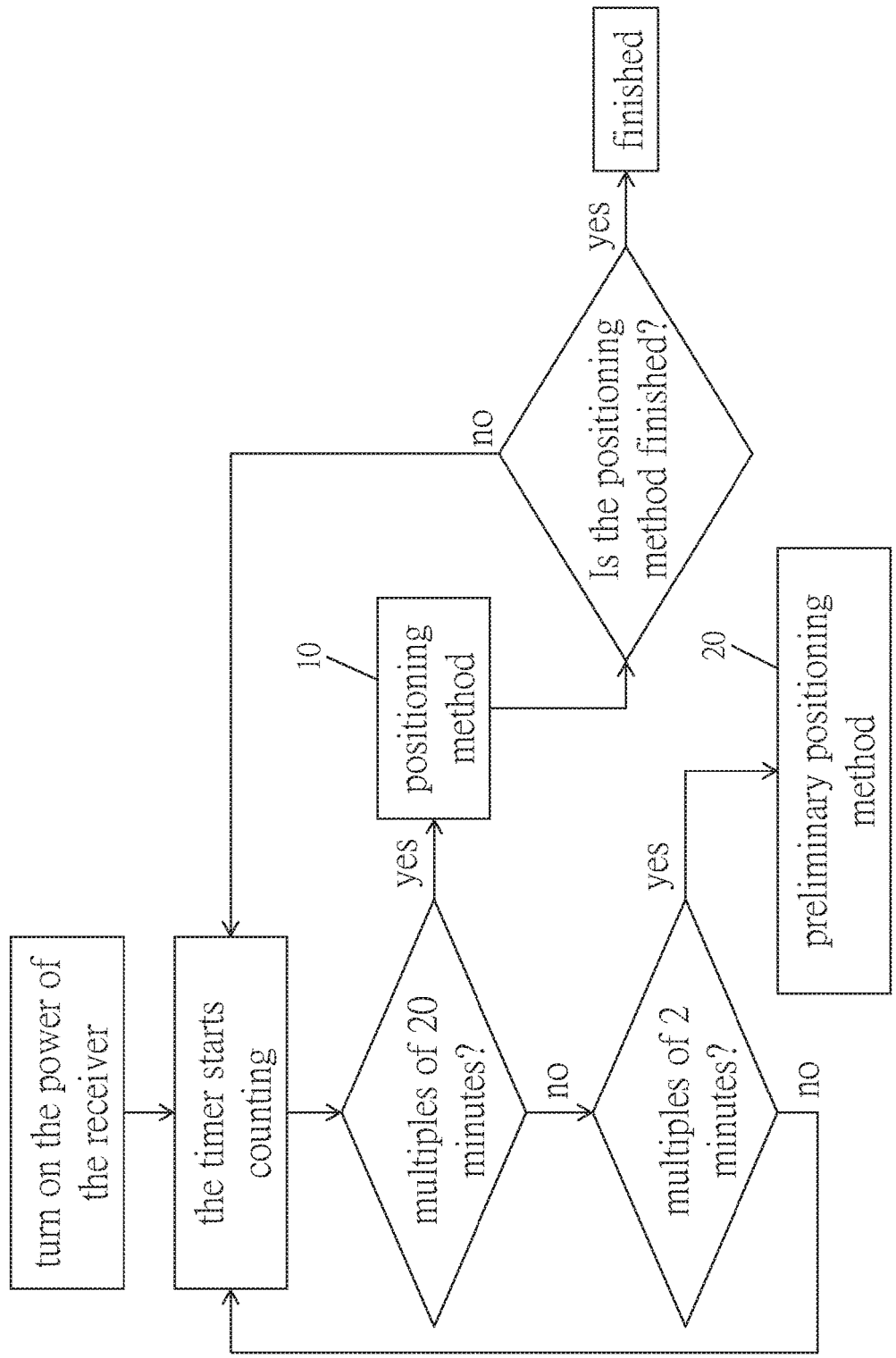
FIG. 2 is a flow chart showing the steps of a method for deciding the position of the TPMS.

Therefore, when the TPMS S is installed on a vehicle, the first thing that needs to be done is the determination of the positions of the sensors U (which tires the sensors were earlier installed in). As shown in FIG. 2, when the receiver R is powered on, a timer (not shown) of the receiver R starts counting. When the time counted is 20 minutes or a multiple of 20 minutes, a positioning method 10 should be implemented. When the time counted is 2 minutes or a multiple of 2 minutes, a preliminary positioning method 20 should be implemented. The preliminary positioning method 20 should be implemented every 2 minutes before the positioning method 10 is finished. When the positioning method 10 is finished, it means that the positions of the respective sensors U are known or determined, the preliminary positioning method 20 should be stopped, and the receiver R continues to receive the tire pressure signals transmitted from the respective sensors U so as to monitor the status of the tires T.

The positioning method 10 is to determine which tires T the sensors U should be installed in. For the related contents, please refer to U.S. Pat. No. 9,205,711, U.S. Appl. No. 2005/0134446, and TWI490131 which is the previous invention of the applicant. The details of the positioning method 10 are omitted here. However, the preliminary positioning method 20 is implemented before the TPMS knows or determines the correct positions of the sensors U, so that the driver can still read the tire pressure data of the respective tires T, but the positional relations between the tire pressure data and the positions of the tires T may not be correct, namely, it is not known that which tires T the tire pressure data belongs to.

Figure 3:
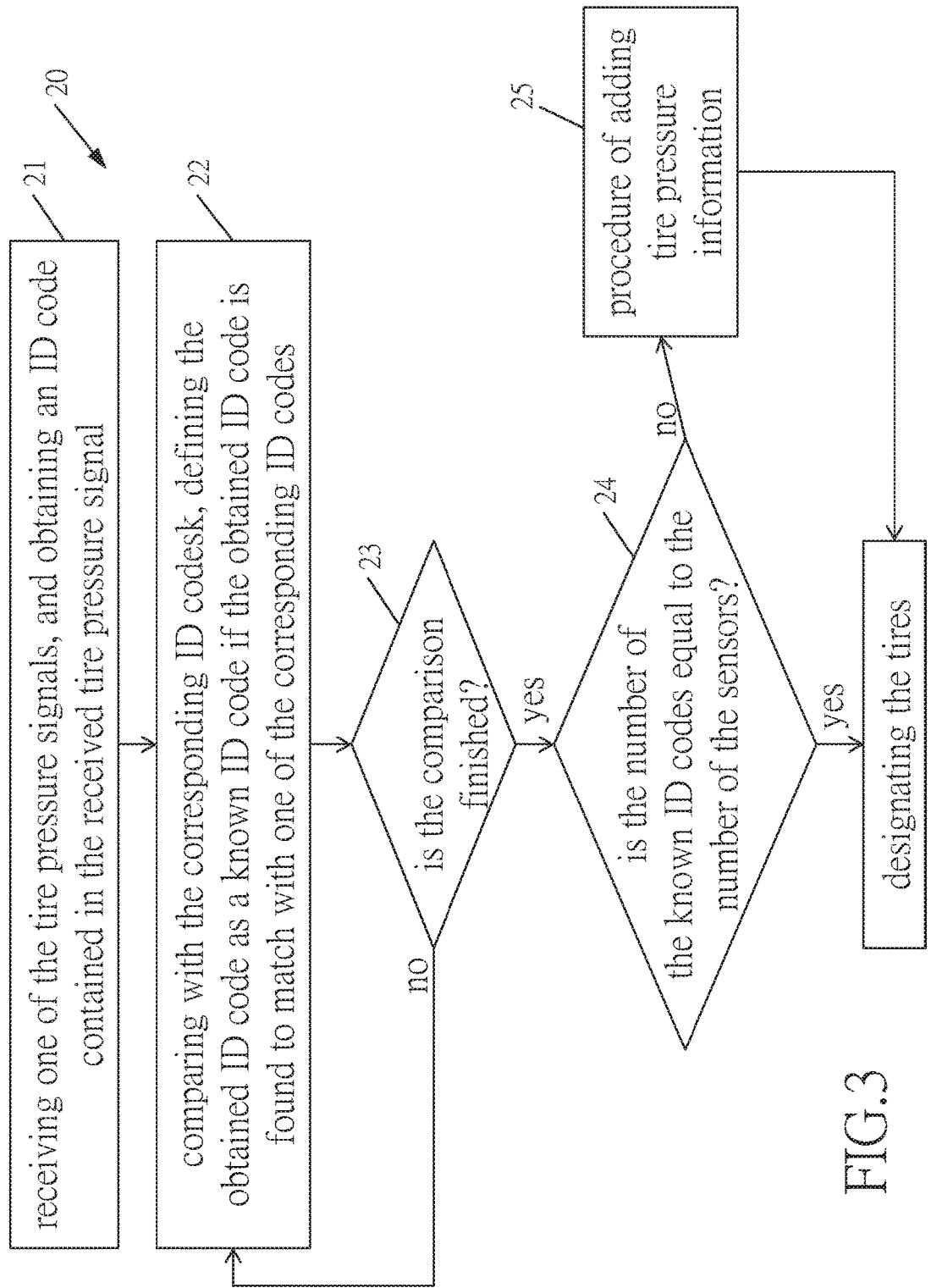
FIG. 3 is a flow chart of the preliminary positioning method in accordance with an embodiment of the present invention.

Referring to FIG. 3, the preliminary positioning method 20 comprises the following steps:

A first step 21 includes: receiving, by the receiver R, one of the tire pressure signals, and obtaining an ID code contained in the received tire pressure signal; A second step 22 includes: comparing the obtained ID code with the corresponding ID codes prestored in the database; defining the obtained ID code as a known ID code and storing the obtained ID code in the database when the obtained ID code is found to match with one of the corresponding ID codes prestored in the database, and not defining the obtained ID code as a known ID code when the obtained ID code is found to match with none of the corresponding ID codes prestored in the database;

A third step 23 includes: repeating the first and second steps 21, 22 until all the ID codes of all the received tire pressure signals have been compared;

A fourth step 24 includes: counting the number of the known ID codes; designating the known ID codes as specific tires T according to an indication (index) of the respective tire pressure signals when the counted number is equal to the number of the sensors U (there are four sensors U in this embodiment), the indication includes various parameters of the tire pressure signals received by the receiver R from the sensor U, these parameters can be the signal strength of the tire pressure signals, temperature data, vibration, frequency and acceleration; implementing a procedure 25 of adding tire pressure information when the number of the known ID codes is less than the number of the sensors U (there are four sensors in this embodiment).

In this embodiment, the indication is the signal strength based on a RSSI (received signal strength indication) of the respective tire pressure signals. In this embodiment, the known ID codes of the two tire pressure signals which have the two biggest RSSIs are designated as the two front tires T, and the known ID codes of the other two tire pressure signals are designated as the two rear tires T. The reason for such designation is because: the distance from the sensors U installed in the front tires T to the receiver R is usually shorter than the distance from the sensors U installed in the rear tires T to the receiver R, therefore, the signal strength of the sensors U installed in the front tires T received by the receiver R is stronger than the signal strength of the sensors U installed in the rear tires T. Such designation can roughly determine that the sensors U are disposed in the front tires T or the rear tires T, but there is still a 50% chance that the positions of the left and right tires T are not correct. For example, there are four sensors in this embodiment, and four tire pressure signals are sent to the receiver, based on signal strength of four tire pressure signals, the known ID code of each of two strong signal strength is designated as the tire which is close to the receiver, and the known ID code of each of two weak signal strength is designated as the tire which is located farther away from the receiver.

In another embodiment, the indication is the temperature data of the tire pressure signals, the known ID codes of the two tire pressure signals which have the two highest temperature data are designated as the two front tires T, and the known ID codes of the other two tire pressure signals are designated as the two rear tires T. The reason for such designation is because the sensors which are close to the engine have a relatively high temperature. Therefore, for a front engine vehicle, the known ID codes of the highest temperature data are designated as the front tires; and for a rear engine vehicle, the known ID codes of the highest temperature data are designated as the rear tires. In another embodiment, the indication can be the vibration, frequency and acceleration of the tire pressure signals. In yet another embodiment, the known ID codes are designated as the tires T according to the time sequence of the known ID codes stored in the database, or in random sequence, or in a predetermined sequence (such as: the left front tire—the right front tire—the left rear tire—the right rear tire). For example, there are four sensors in this embodiment, and four tire pressure signals are sent to the receiver, based on temperature data of four tire pressure signals, the known ID code of each of two high temperature data is designated as the tire which is close to the receiver, and the known ID code of each of two low temperature data is designated as the tire which is located farther away from the receiver.

Figure 4:
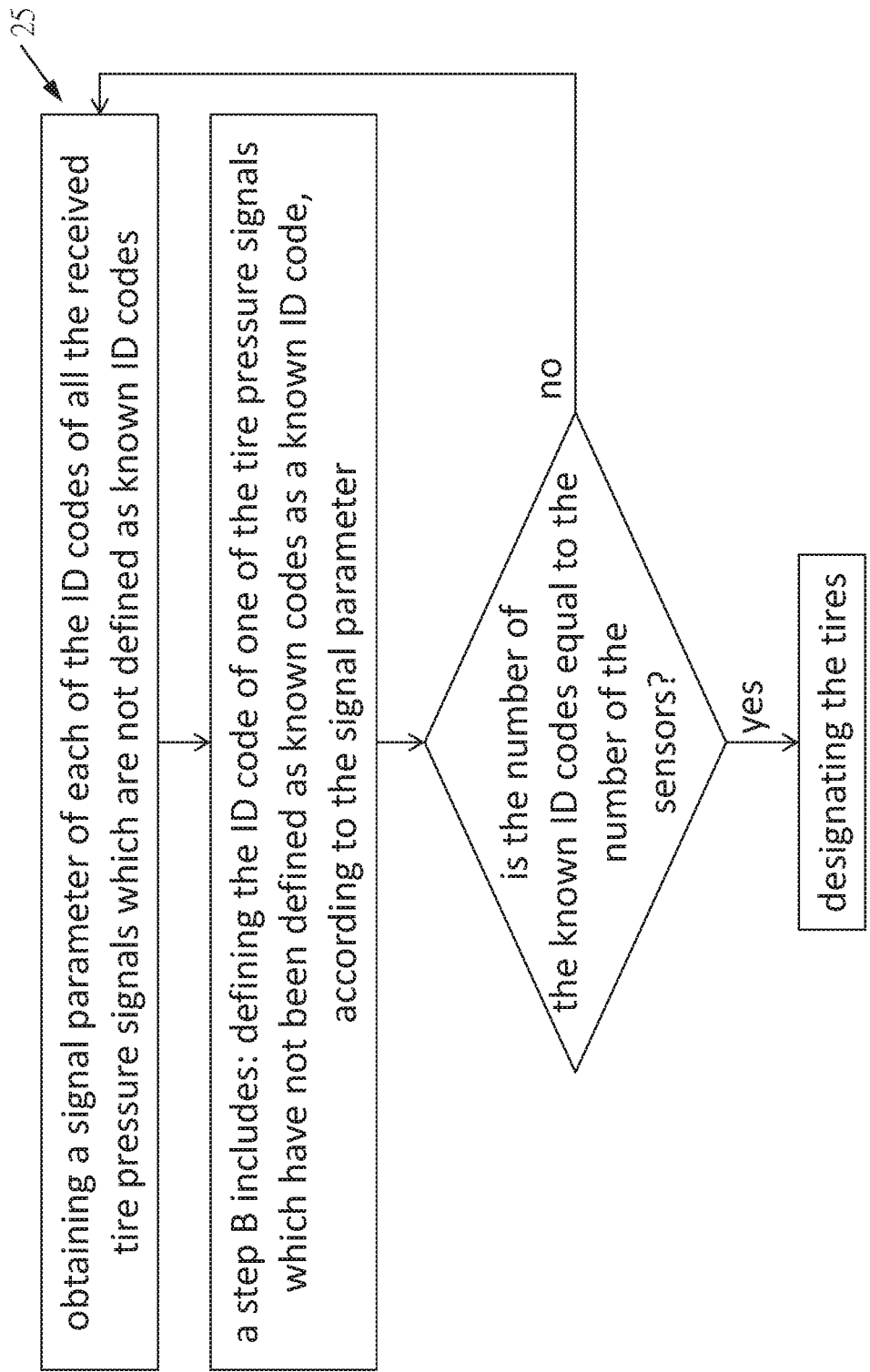
FIG. 4 is a flow chart of the procedure of adding tire pressure information in accordance with an embodiment of the present invention.

However, when the sensors U fail, or have poor contact, the power supply of the sensors fails, the receiver R might not be able to receive signals. This situation probably continues, or probably disappears after a while. However, when the tire pressure signal sent from at least one sensor U cannot be received by the receiver, the driver will see the incomplete tire pressure data, and therefore will be scared. The procedure 25 of adding tire pressure information is implemented when the tire pressure signal of at least one sensor U cannot be received by the receiver. As shown in FIG. 4, the procedure 25 of adding tire pressure includes the following steps:

A step A includes: obtaining a signal parameter of all the received tire pressure signals whose ID codes are not defined as the known ID codes;

A step B includes: defining the ID code of one of all the received tire pressure signals which have not been defined as the known codes as the known code, according to the signal parameter; In this embodiment, the step B includes: defining the ID code of the tire pressure signals which have the largest signal parameter as a known ID code which is then stored in the database.

A screening process is performed before the step B to eliminate the tire pressure signal with a relatively low pressure (for example, the pressure is lower than 10 KPA), then proceed the step B. The reason for doing so is that the sensor U which sent the relatively low pressure signal is probably not installed in the tires T, and the values cannot be used as reference.

In one embodiment, the signal parameters refer to the signal amount of the tire pressure signals received in a unit of time, the ID code of one of the received tire pressure signals which has the largest signal amount is defined as a known ID code. In another embodiment, the signal parameter refer to the signal strength of the tire pressure signals, the ID code of one of the tire pressure signals which has the biggest RSSI is defined as a known ID code.

A step C includes: repeating the steps A and B until the number of the known ID codes is equal to the number of the sensors U.

A step D includes: designating the known ID codes as specific tires T according to an indication (index) of the respective tire pressure signals. The step D is the same as the fourth step 24 of the preliminary positioning method 20, therefore, the details of which are omitted here.

It is to be noted that the TPMS S of the present invention can be installed on a vehicle which has more than four tires T, such as trucks, or container trucks; and can also be installed on the vehicle which has less than four tires T, such as three-wheel or two wheel vehicles. In some vehicles, not all tires are equipped with the sensors U. The preliminary positioning method 20 and the procedure 25 of adding tire pressure information of the present invention all can be implemented in the above vehicles.

It can be learned from the above description that the preliminary positioning method for the TPMS of the present invention uses the receiver R to receive a tire pressure signal, then obtains the ID code contained in the obtained tire pressure signal, then compares the ID code with the corresponding ID codes stored in the database, and defines the ID code as a known ID code, when the ID code is found to match with one of the corresponding ID codes prestored in the database. The ID code is not defined as a known ID code, when the ID code is found to match with none of the corresponding ID codes prestored in the database. Repeating the above steps until the ID codes of all received tire pressure signals all have been compared. When the number of the known ID codes is equal to the number of the sensors U, the known ID codes are designated as specific tires T according to an indication (index) of the respective tire pressure signals, so that the positioning function can be achieved in a short period of time.

When the receiver R is unable to receive the tire pressure signal sent from the sensors U, a procedure of adding tire pressure information is implement and includes: obtaining a signal parameter of all the ID codes of the tire pressure signals which are not defined as the known ID codes; defining the ID code of the tire pressure signals which have the largest signal parameter as a known ID code which is then stored in the database; repeating the above steps A and B until the number of the known ID codes is equal to the number of the sensors U; designating the known ID codes as specific tires T according to an indication (index) of the respective tire pressure signals. Therefore, the problem of the incomplete tire pressure data caused when the receiver R is unable to receive the tire pressure signal sent from the sensors U can be solved.

While we have shown and described various embodiments in accordance with the present invention, it is clear to those skilled in the art that further embodiments may be made without departing from the scope of the present invention.

What is claimed is:

1. A preliminary positioning method for a tire pressure monitoring system, wherein the tire pressure monitoring system is installed in a vehicle which has a plurality of tires, and comprises a receiver and a plurality of sensors, each of the sensors is installed in the tires to produce a tire pressure signal which contains a tire pressure data and an ID code, the tire pressure signal is sent to the receiver, the receiver includes a database in which is stored a plurality of corresponding ID codes; the preliminary positioning method comprising the following steps:

a first step including: receiving the tire pressure signal and obtaining the ID code contained in the received tire pressure signal;

a second step including: comparing the obtained ID code with the corresponding ID codes stored in the database, defining the obtained ID code as a known ID code when the obtained ID code is found to match with one of the corresponding ID codes;

a third step including: repeating the first and second steps until all ID codes of all received tire pressure signals have been compared; and a fourth step including: counting the number of the known ID codes;

either designating each of the known ID codes as a specific tire when the number of the known ID codes is equal to the number of the sensors; or implementing a procedure of adding tire pressure information when the number of the known ID codes is less than the number of the sensors;

wherein the procedure of adding tire pressure information includes the following steps:

a step A includes: obtaining a signal parameter of all the received tire pressure signals whose ID codes are not defined as the known ID codes;

a step B includes: defining the ID code of one of all the received tire pressure signals which have not been defined as the known codes as the known code, according to the signal parameter;

a step C includes: repeating the steps A and B until the number of the known ID codes is equal to the number of the sensors; and a step D includes: designating each of the known ID codes as the specific tire.

2. The preliminary positioning method as claimed in claim 1, wherein in the fourth step and in the step D, the number of the sensors is four, and four tire pressure signals are sent to the receiver, based on signal strength of four tire pressure signals, the known ID code of each of two strong signal strength is designated as the tire which is close to the receiver, and the known ID code of each of two weak signal strength is designated as the tire which is located farther away from the receiver.

3. The preliminary positioning method as claimed in claim 1, wherein in the fourth step and in the step D, the number of the sensors is four, and four tire pressure signals are sent to the receiver, based on temperature data of four tire pressure signals, the known ID code of each of two high temperature data is designated as the tire which is close to the receiver, and the known ID code of each of two low temperature data is designated as the tire which is located farther away from the receiver.

4. The preliminary positioning method as claimed in claim 1, wherein in the step B, the signal parameter refers to a signal amount of the tire pressure signals received in a unit of time, the ID code of one of the received tire pressure signals which has the largest signal amount is defined as the known ID code.

5. The preliminary positioning method as claimed in claim 1, wherein in the step B, the signal parameter refers to signal strength of the tire pressure signal, the ID code of one of the received tire pressure signals which has the strongest signal strength is defined as the known ID code.

6. The preliminary positioning method as claimed in claim 1, wherein each of the second step and the step B further includes storing the known ID code in the database.

7. A procedure of adding tire pressure information for a tire pressure monitoring system, wherein the tire pressure monitoring system is installed in a vehicle which has a plurality of tires, and comprises a receiver and a plurality of sensors, each of the sensors is installed in the tires to produce a tire pressure signal which contains a tire pressure data and an ID code, the tire pressure signals are sent to the receiver, the receiver includes a database in which is stored a plurality of corresponding ID codes, the receiver receives the tire pressure signals and compares the ID codes with the corresponding ID codes stored in the database, and defines the ID codes as known ID codes when the ID codes are found to match with the corresponding ID codes, the procedure of adding tire pressure information is implemented when the number of the known ID codes is less than the number of the sensors;

wherein the procedure of adding tire pressure information includes the following steps:

a step A includes: obtaining a signal parameter of all the received tire pressure signals whose ID codes are not defined as the known ID codes;

a step B includes: defining the ID code of one of all the received tire pressure signals which have not been defined as the known codes as the known code, according to the signal parameter;

a step C includes: repeating the steps A and B until the number of the known ID codes is equal to the number of the sensors; and a step D includes: designating each of the known ID codes as the specific tire, according to an indication of the tire pressure signals which have been defined as the known ID codes.

8. The procedure of adding tire pressure information as claimed in claim 7, wherein in the step D of the procedure of adding tire pressure information, the indication is signal strength of the tire pressure signal, the number of the sensors is four, and four tire pressure signals are sent to the receiver, based on signal strength of four tire pressure signals, the known ID code of each of two strong signal strength is designated as the tire which is close to the receiver, and the known ID code of each of two weak signal strength is designated as the tire which is located farther away from the receiver.

9. The procedure of adding tire pressure information as claimed in claim 7, wherein in the step D, the number of the sensors is four, and four tire pressure signals are sent to the receiver, based on temperature data of four tire pressure signals, the known ID code of each of two high temperature data is designated as the tire which is close to the receiver, and the known ID code of each of two low temperature data is designated as the tire which is located farther away from the receiver.

10. The procedure of adding tire pressure information as claimed in claim 7, wherein in the step B, the signal parameter refers to a signal amount of the tire pressure signals received in a unit of time, the ID code of one of the received tire pressure signals which has the largest signal amount is defined as the known ID code.

11. The procedure of adding tire pressure information as claimed in claim 7, wherein in the step B, the signal parameter refers to signal strength of the tire pressure signal, the ID code of one of the received tire pressure signals which has the strongest signal strength is defined as the known ID code.

12. The procedure of adding tire pressure information as claimed in claim 7, wherein the step B further includes storing the known ID codes in the database.

* * * * *